(12) United States Patent
Appleton et al.

(10) Patent No.: US 9,177,723 B2
(45) Date of Patent: Nov. 3, 2015

(54) HIGH VOLTAGE HIGH CURRENT TRANSMISSION LINE

(71) Applicant: BAE Systems Land & Armaments, L.P., Santa Clara, CA (US)

(72) Inventors: Randall J. Appleton, West St. Paul, MN (US); Timothy J. Doering, Anoka, MN (US)

(73) Assignee: BAE Systems Land & Armaments L.P., Santa Clara, CA (US)

( * ) Notice: Subject to any disclaimer, the term of this patent is extended or adjusted under 35 U.S.C. 154(b) by 413 days.

(21) Appl. No.: 13/834,125

(22) Filed: Mar. 15, 2013

(65) Prior Publication Data

US 2014/0262432 A1 Sep. 18, 2014

(51) Int. Cl.
| | |
|---|---|
| *H01R 13/50* | (2006.01) |
| *H01G 4/228* | (2006.01) |
| *H01R 13/53* | (2006.01) |
| *H01R 13/52* | (2006.01) |
| *H01R 13/64* | (2006.01) |

(52) U.S. Cl.
CPC ............ *H01G 4/228* (2013.01); *H01R 13/5216* (2013.01); *H01R 13/53* (2013.01); *H01R 13/50* (2013.01); *H01R 13/64* (2013.01); *H01R 2201/26* (2013.01); *Y10T 29/49117* (2015.01)

(58) Field of Classification Search
CPC ...................................................... H01R 13/50
USPC ............ 174/125.1, 60, 61, 54, 64, 53, 129 R, 174/99 B; 439/74, 570
See application file for complete search history.

(56) References Cited

U.S. PATENT DOCUMENTS

| | | | | | |
|---|---|---|---|---|---|
| 4,822,951 | A | * | 4/1989 | Wilson et al. ................ | 174/68.2 |
| 5,066,240 | A | * | 11/1991 | Verdun ......................... | 439/181 |
| 5,254,013 | A | * | 10/1993 | Tanaka .......................... | 439/352 |
| 6,552,274 | B1 | * | 4/2003 | Nakamura .................... | 174/151 |
| 6,674,006 | B1 | * | 1/2004 | Linehan et al. ............. | 174/72 B |
| 7,173,809 | B2 | * | 2/2007 | Bauer et al. .................. | 361/611 |
| 7,808,775 | B2 | * | 10/2010 | Cherney et al. .............. | 361/624 |

* cited by examiner

*Primary Examiner* — William H Mayo, III
*Assistant Examiner* — Krystal Robinson
(74) *Attorney, Agent, or Firm* — Patterson Thuente Pedersen, P.A.

(57) ABSTRACT

A high voltage high current transmission line for transmitting high voltage high current energy in the 10 kV and 200,000 A range from a power source to an end item to which the power is delivered. The high voltage high current transmission line includes two generally parallel configured conductive plates with an overlapping dielectric layering configuration. Each of the conductive plates are encompassed by a first dielectric material, both of the conductive plates encompassed by a second dielectric material, and the conductive plates are encompassed by an outer dielectric sheathing. The dielectric layering configuration may also include a dielectric material applied to the edges of the conductive plates. At one or both ends of the high voltage high current transmission line, a plug assembly may be provided for connecting to the power source and/or the discharge device. The high voltage high current transmission line may also include an exposed conductive plate surface with a staggered configuration such that the exposed surfaces of the conductive plates do not overlap.

18 Claims, 10 Drawing Sheets

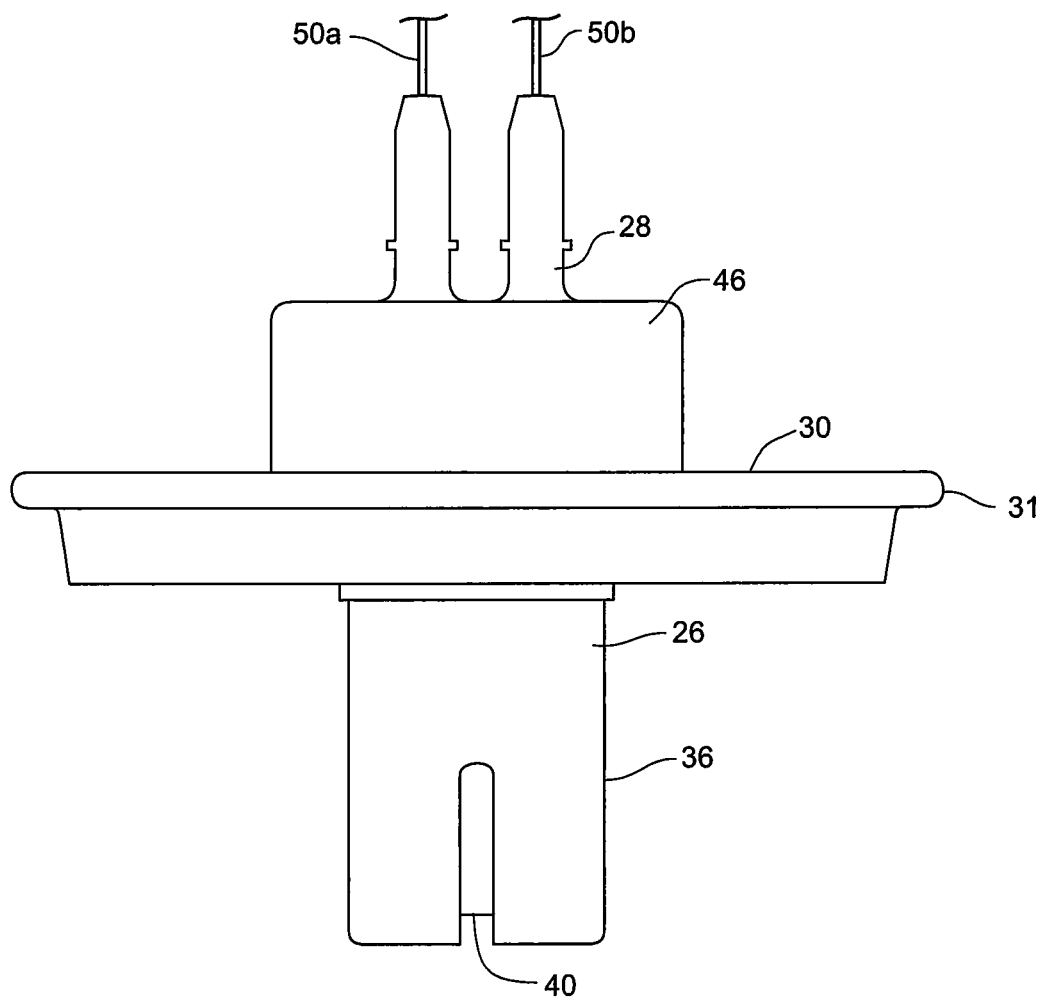

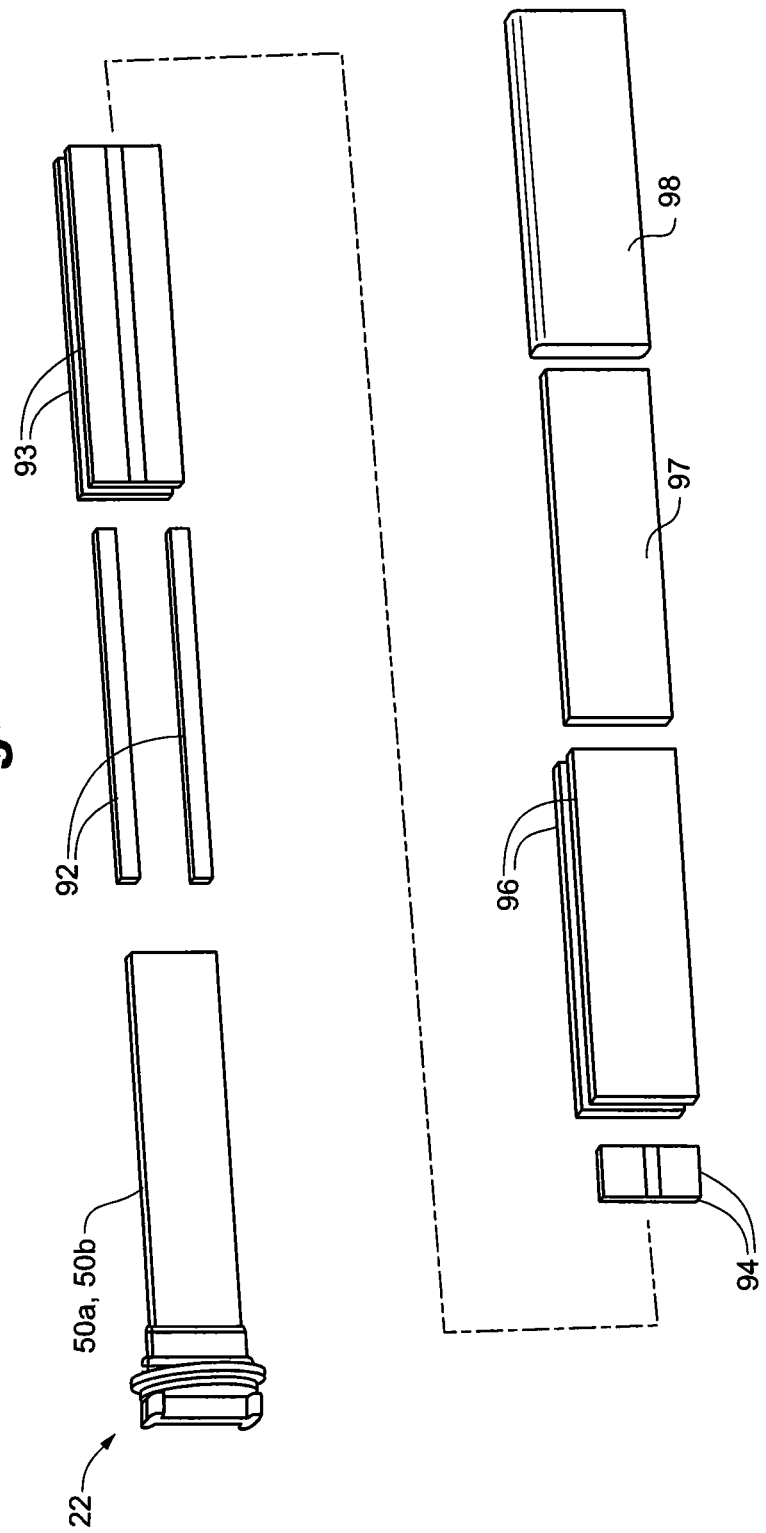

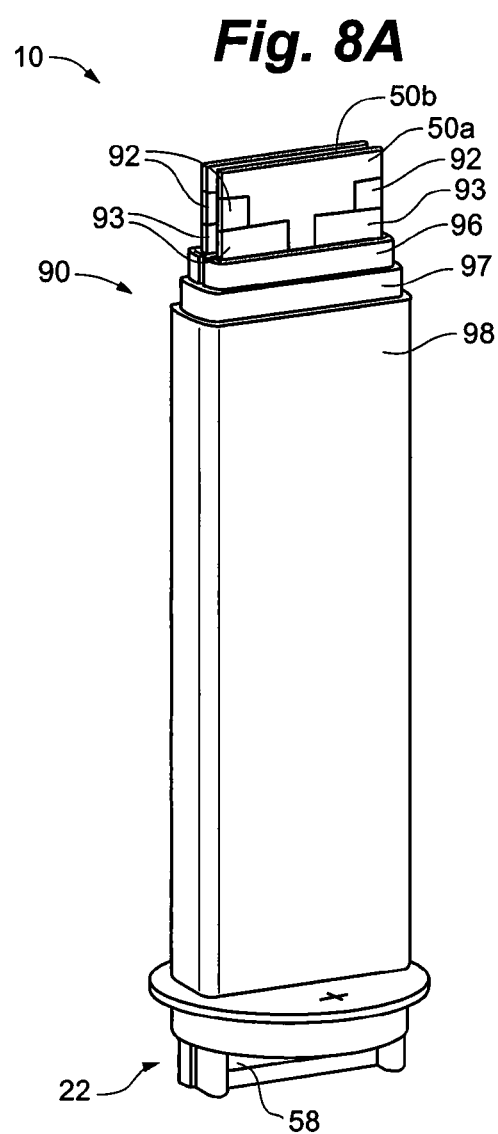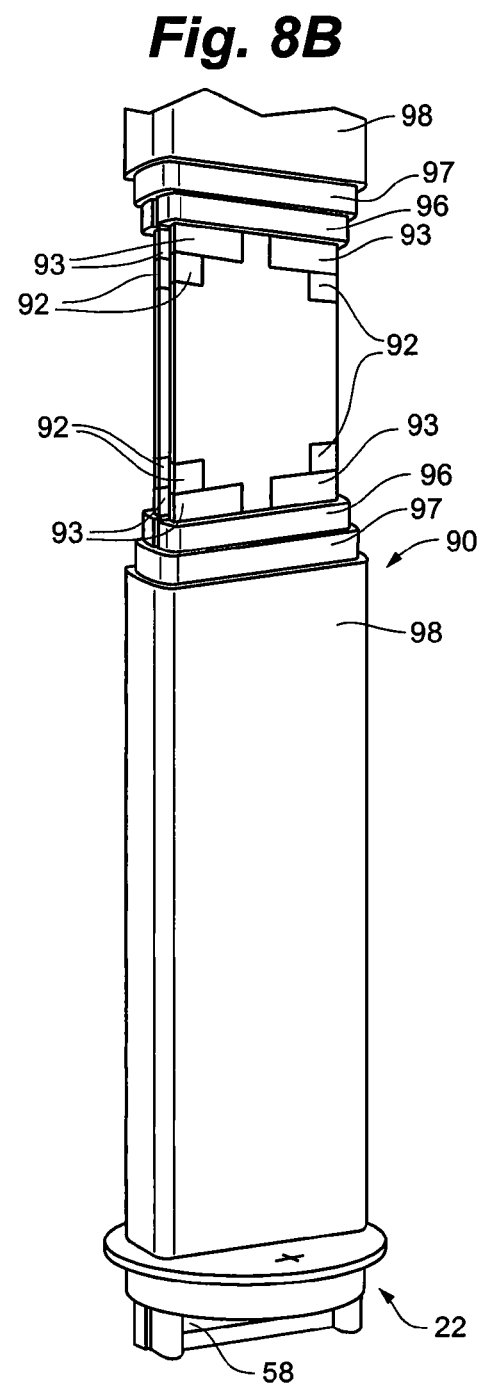

HIGH VOLTAGE HIGH CURRENT TRANSMISSION LINE

This invention was made with Government support under U.S. Government Contract W911QX-08-C-0077, awarded by U.S. Army Contracting Command. The government has certain rights in the invention.

FIELD OF THE INVENTION

The present invention generally relates to a transmission line for high voltage high current applications. More particularly, the present invention is directed to an environmentally robust transmission line for safely and efficiently transmitting high voltage high current from a power source to an end item to which the power is delivered, such as a discharge device.

BACKGROUND OF THE INVENTION

Certain electrical applications involve the use of high voltage, high current devices. For example, certain applications store large charges in large, high capacity capacitors. An important consideration in high voltage high current applications is the transmission of the high voltage high current from the power source and the end item to which the power is delivered, such as a discharge device. The presence of high voltage high current electricity creates the possibility of power loss by inductance and the generation of heat during the transmission process, as well as the high potential for arcing between the poles of the high voltage high current device.

In some applications, capacitors may create voltages in the realm of at least ten kilovolts when static charged and during discharge. In the past few years, there has been considerable improvement in the area of pulsed power research, which involves storing, shaping, and performance of high energy density capacitors used in pulsed power applications. Pulsed power applications pertain to numerous areas including at least laser drivers, high power microwave generators, particle accelerators, nuclear fusion, electromagnetic mass drivers, medical equipment, and industrial manufacturing technology. High pulsed power systems with capacitors capable of energy in the 10 kV and 150,000 A range have also found military applications, including in current military vehicles and future combat systems. The requirements for components in pulsed power applications in military applications are more taxing than that of other market segments due to the systems being mobile rather than fixed emplacements, the systems operating in hostile environments rather than controlled climate laboratories, the systems requiring more periodic maintenance service, which needs to be quick and efficient without affecting safety, and the systems having other criteria requirements such as size and weight constraints, as well as performance criteria.

A high voltage high current transmission line capable of providing dielectric to over 10 kV during both static and discharging modes, transmitting high currents in the range of 200 kA, achieving power transmission with minimal line loss (i.e., low inductance), operating in extremes of outside environments, and remaining flexible to allow for variations in power source and discharge device location is not known by the inventors to exist in the prior art. Another issue with the use of such high voltage and high current devices is isolation from the environment. In particular, the leakage of water into a high voltage high current device, the transmission line, and/or the connection therebetween can create short circuiting and arcing in short order. While there may be transmission lines existing in the prior art to meet these sorts of dielectric and environmental constraints, such lines are capable of operating at only a very small fraction of the power levels required for this specialized high voltage high current application.

Thus, there is a need for a high voltage high current transmission line for pulsed power systems. In mobile military applications, the need for a high voltage high current transmission line must also be able to survive the tactical environment, including for instance, shock, vibration, rain, dust, water immersion, fog, humidity, fungus and the like while also being able to meet size, weight, and performance requirements. There is also the need for a high voltage high current transmission line that can be used in current pulsed power systems.

BRIEF SUMMARY OF THE INVENTION

The high voltage high current transmission line of the present invention addresses many of the above considerations. The high voltage high current transmission line of the present invention provides a dielectric strength of over 10 kilovolts both for static charged high capacity capacitors and during discharge of high capacity capacitors. The high voltage high current transmission line of the present invention is also capable of transmitting high currents in the range of 200 kiloamps (pulsed), while achieving the power transmission with minimal line loss (i.e., low inductance). The high voltage high current transmission line of the present invention is also capable of absorbing the heat generated while maintaining flexibility for operation. The high voltage high current transmission line of the present invention is further capable of surviving the tactical environment, including for instance, shock, vibration, rain, dust, water immersion, fog, humidity, fungus and the like while also being able to meet size, weight, and performance requirements in current pulsed power systems, including mobile military applications.

In one aspect, the high voltage high current transmission line of the present invention generally includes two conductive plates, also referred to as biplates, configured in a generally parallel configuration, the high voltage high current transmission line having an intermediate transmission section electrically connecting a connector end and a load end.

In one aspect, the connector end of the present invention is configured to connect two electrodes (positive and negative) to the corresponding contacts of a high voltage high current power source, and the load end of the present invention is configured to connect the high voltage high current transmission line to an end item to which the power is delivered, such as a discharge device. The connector end of the present invention features a sufficiently high contact force between the electrodes of the high voltage high current transmission line and the corresponding contacts of the high voltage high current power source to minimize arcing therebetween. In one aspect, each of the two electrodes on the connector end have an exposed section on the respective conductive plate that electrically connects to the respective electrical contact on the high voltage high current power source.

In one aspect, the connector end of the present invention includes a plug assembly that operably engages a header assembly of the high voltage high current power source that is structured to receive the plug assembly. In one aspect, the header assembly has electrical contacts that provide an electrical connection between each of the respective two electrodes on the connector end and the respective electrode on the high voltage high current power source.

In one aspect, the plug assembly generally includes a plug body supporting the two conductive plates through and within the plug body. The plug body is a generally unitary structure including an inner extension, an outer extension and a centrally located disk. The plug body defines internal biplate passages for the two conductive plates. The inner extension generally includes a ridge, a biplate backer, two end plates, a symmetrical polarity slot and a rail receiving slot at a distal end thereof. The two end plates are oriented generally perpendicular to the ridge. The inner extension ridge extends generally perpendicular to the disk and to the biplate backer. The outer extension generally defines recess finger pulls thereon and biplate ridges extending outwardly away from the finger pulls. The biplate passages pass through and are defined by the biplate ridges of the outer extension as well as the ridge of the inner extension. The disk of the plug body is generally circular in structure and defines an annular ridge and a plateau extending outwardly perpendicularly from the disk in the same direction as the outer extension. The disk may also present polarity markings thereon to identify negative and positive polarities of the plug body.

In one aspect, the biplates at the connector end include a straight portion, a tapered portion, a hook portion and an external portion. The biplates pass through the plug body and are positioned within the biplate passages. The external portion of the biplates extends outwardly beyond the biplate ridges of the outer extension, which then becomes the intermediate transmission section electrically connecting the connector end and the load end. The straight portion of the biplates extends along the biplate backer while the tapered portion and hook portion extend around the distal edge of the biplate backer. In one aspect, each of the hook portions of the biplates contain at least one exposed section that forms an electrode to electrically connect the high voltage high current transmission line to the contacts of the high voltage high current power source.

In one aspect, the connector end of the present invention has geometry and materials appropriate to provide an effective spring behind conducting copper leads of the connector which then forces the contacts together. An external ring may be applied to the connector end and screwed down with a wrench onto the header assembly forcing the plug assembly toward the header assembly to provide the axial force to cause the proper contact force.

In one aspect, the connector end of the present invention has a highly effective environmental seal between the exposed electrodes and the outside environment. The environmental seal of the present invention inhibits, for example, leakage of water into the connection between the high voltage high current power unit and the two electrodes of the connector end. The connector end of the present invention is capable of withstanding an operating voltage of over 10 kilovolts between the hot and ground sides of an internal storage device such as a high voltage high current capacitor. The selection of materials and design of the connector end takes into account surface creep of voltage.

In one aspect, the intermediate transmission section of the present invention is configured such that there are at least two layers of dielectric material, with each of the two conductive plates separately encompassed in at least one dielectric material, and the two conductive plates encompassed together in at least one dielectric material. In one aspect, the two conductive plates are separately encompassed within at least one layer of dielectric material, and two or more layers of dielectric material encompass both of the two conductive plates around the first layer of dielectric material separately encompassing the two conductive plates.

In one aspect, the intermediate transmission section of the present invention is configured such that each of the two conductive plates have a dielectric material applied to the longitudinal edges, each of the two conductive plates separately encompassed within at least one dielectric material, and the two conductive plates encompassed together within at least one dielectric material. In one aspect, the two conductive plates having dielectric material applied to the longitudinal edges and separately encompassed within at least one layer of dielectric material are encompassed together in two or more layers of dielectric material.

In one aspect, the intermediate transmission section of the present invention is configured such that each of the two conductive plates have a dielectric material collar applied proximate the interface with the end connector such that each dielectric collar encompasses at least a portion of the respective conductive plate and at least a portion of the end connector encompassing the respective conductive plate. In one aspect, the dielectric collar encompasses the respective conductive plate directly. In another aspect, at least one layer of dielectric material is intermediate the respective conductive plate and the respective dielectric collar. In another aspect, at least one dielectric collar is layered around both conductive plates, whether the dielectric collar is layered directly on the conductive plates or with at least one intermediate dielectric layer on the conductive plates.

In one aspect, the intermediate transmission section has at least one outer sheathing layer providing a highly effective environmental seal between the one or more dielectric layers encompassing the conductive plates and the outside environment. The outer sheathing layer inhibits, for example, leakage of water or other environmental materials into the inner dielectric material and two conductive plates.

In one aspect, the load end of the present invention has the two conductive electrodes having exposed sections in a staggered configuration, such that the exposed section of one conductive electrode does not correspond with the exposed section of the other conductive electrode. In one aspect, the exposed section of one conductive electrode corresponds with the section of the other conductive electrode having one or more dielectric layers in that general area. In another aspect, the two conductive electrodes at the load end have different lengths such that the exposed section of one conductive electrode corresponds with no portion of the second conductive electrode.

In one aspect, the high voltage high current transmission line of the present invention generally includes two conductive plates configured in a generally parallel configuration, the high voltage high current transmission line having an intermediate transmission section electrically connecting a connector end having a plug assembly and a load end having a plug assembly.

In one aspect, the two conductive plates or biplates are formed of a highly conductive metallic material such as for example, copper. The two conductive plates in some aspects are about 2 inches to about 5 inches wide with a thickness between about 0.02 inches and about 0.125 inches, in some other aspects about 2.5 inches to about 3.5 inches wide with a thickness of about 0.025 inches to about 0.0625 inches.

In one aspect, the dielectric layers are formed from a high voltage dielectric tape, high voltage heat shrink tubing, or a combination thereof.

In one aspect, the outer sheathing is formed of an elastomeric polyurethane to maintain flexibility on the high voltage high current transmission line.

In one aspect, the high voltage high current transmission line of the present invention is manufactured by providing two conductive plates having a proximal end and a distal end, each of the conductive plates having a hook portion on the proximal end, arranging the conductive plates such that the two conductive plates are generally parallel with the hook portions facing each other and a space provided between the hook portions, casting an elastomeric material around at least a portion of the proximal end and in the space between the hook portions, which provides an interface located where the elastomeric material is cast around the two conductive plates and where the elastomeric material is not cast around the two conductive plates, and applying at least one dielectric material on at least one of the two conductive plates proximate the interface.

In one aspect, the conductive plates each have a hook portion on the distal end, such that the hook portions on the distal end face each other with a space therebetween during the step of arranging the conductive plates in a generally parallel configuration, and further includes casting an elastomeric material around at least a portion of the distal end and in the space between the hook portions, which provides another interface located where the elastomeric material is cast around the two conductive plates and where the elastomeric material is not cast around the two conductive plates on the distal end.

In one aspect, the process of manufacturing includes applying a first dielectric layer around at least a portion of each of the two conductive layers and applying a second dielectric layer around at least a portion of both of the two conductive layers proximate the first dielectric layer.

In one aspect, the process of manufacturing includes applying a dielectric material over the edge of at least a portion of each of the two conductive layers, applying a first dielectric layer around at least a portion of each of the two conductive layers proximate the dielectric material over the edges, and applying a second dielectric layer around at least a portion of both of the two conductive layers proximate the first dielectric layer.

These and other aspects of the present invention are described in the following claims or will become apparent to one of ordinary skill in the art from the detailed description of the invention in connection with the accompanying drawings.

BRIEF DESCRIPTION OF THE DRAWINGS

FIG. 6 is a plan view of the plug assembly as depicted in FIGS. 2-4;

FIG. 7 is an exploded perspective view of a high voltage high current transmission line according to an example embodiment of the present invention;

FIG. 8A is a perspective of a high voltage high current transmission line with the dielectric material layers and the outer sheathing layer peeled away proximate the load end to depict the layering of the dielectric material layers and outer sheathing layer proximate the load end according to an example embodiment of the present invention;

FIG. 8B is a perspective of a high voltage high current transmission line with the dielectric material layers and the outer sheathing layer peeled away proximate the intermediate transmission section to depict the layering of the dielectric material layers and outer sheathing layer proximate the intermediate transmission section according to an example embodiment of the present invention;

While the present invention is amenable to various modifications and alternative forms, specifics thereof have been shown by way of example in the preceding drawings and will be further described in detail. In should be understood, however, that the intention is not to limit the present invention to the particular embodiments described. On the contrary, the intention is to cover all modifications, equivalents, and alternatives falling within the spirit and scope of the invention as defined in the appended claims.

DETAILED DESCRIPTION OF THE PRESENT INVENTION

While the present invention may be embodied in many different forms, there are described in detail herein specific preferred embodiments. This description is an exemplification of the principles of the present invention and is not intended to limit the invention to the particular embodiments illustrated.

The present invention is a high voltage high current transmission line capable of providing a dielectric strength of over 10 kilovolts both for static charged high capacity capacitors and during discharge of high capacity capacitors. The high voltage high current transmission line of the present invention is also capable of transmitting high currents in the range of 200 kiloamps, while achieving the power transmission with minimal line loss (i.e., low inductance). A primary application of the high voltage high current transmission line is in a pulsed power system having energy in the 10 kV and 200,000 A range. The high voltage high current transmission line of the present invention is also capable of absorbing the heat generated while maintaining flexibility for operation. The high voltage high current transmission line of the present invention is further capable of surviving the tactical environment, including for instance, shock, vibration, rain, dust, water immersion, fog, humidity, fungus and the like while also being able to meet size, weight, and performance requirements in current pulsed power systems, including mobile military applications. In one aspect, the high voltage high current transmission line is used in a pulsed power system in a fixed emplacement and a controlled environment such as a laboratory. In another aspect, the high voltage high current transmission line is used in a pulsed power system in a mobile system such as provided in a military operational environment that is subject to a hostile environment that includes shock, vibration, rain, dust, water immersion, humidity and the like.

Figure 1:
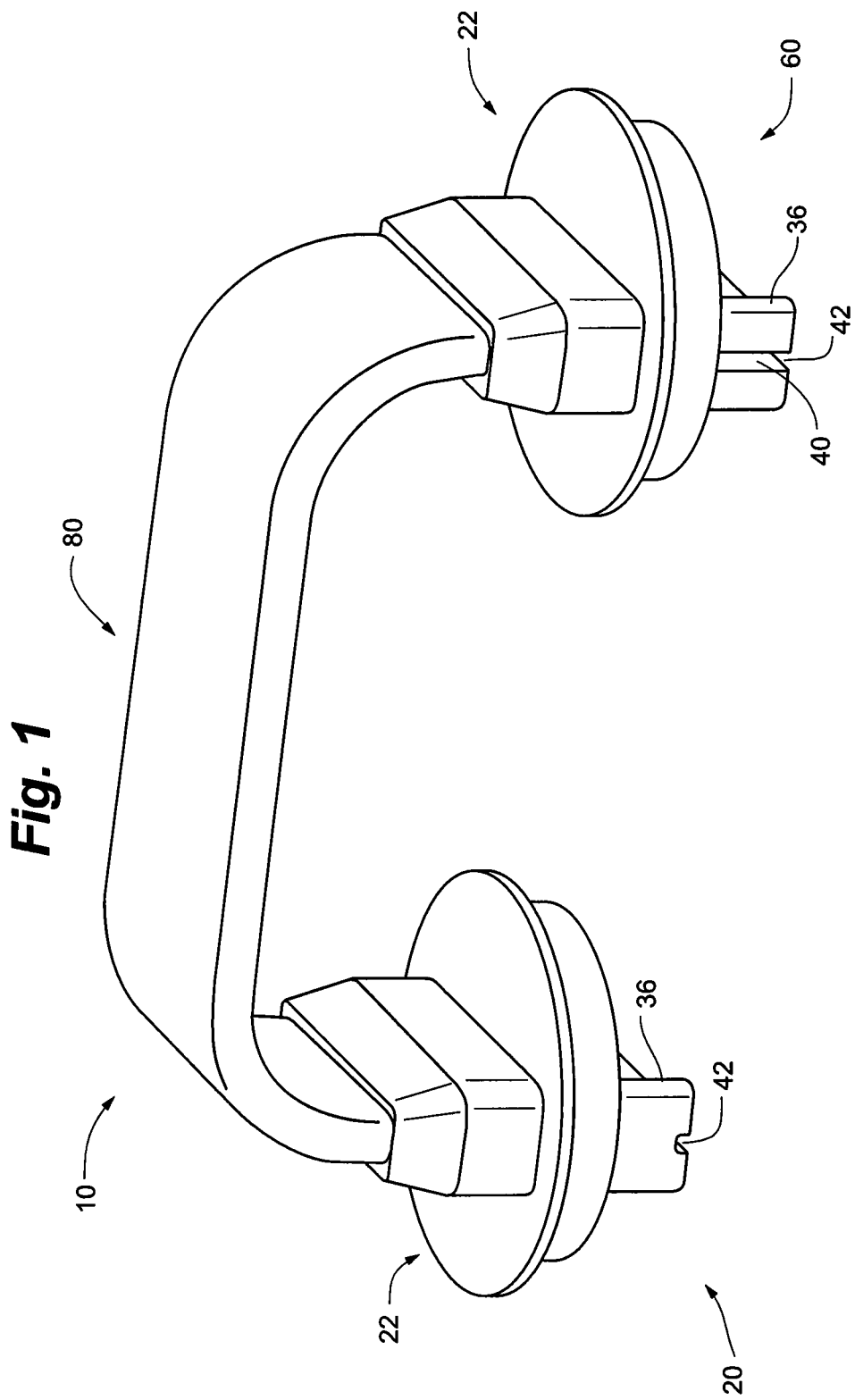
FIG. 1 is a perspective view of a high voltage high current transmission line including an intermediate transmission section electrically connecting a connector end and a load end according to an example embodiment of the present invention.
Figure 2:
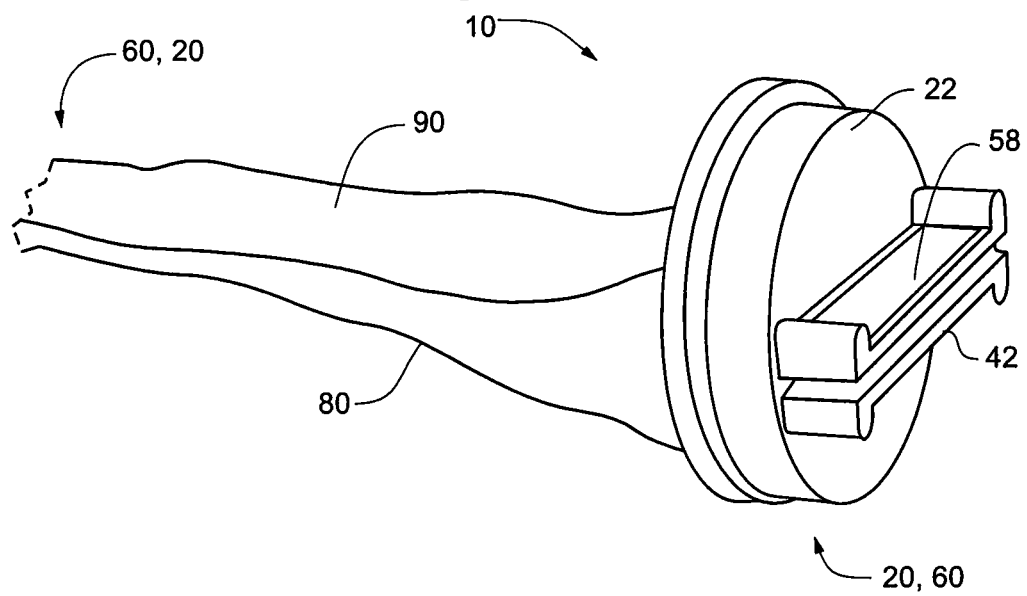
FIG. 2 is a perspective view of one end of a high voltage high current transmission line including an intermediate transmission section and a load end having a plug assembly according to an example embodiment of the present invention.

Referring now to the figures, the high voltage high current transmission line of the present invention is generally designated by the reference numeral 10. Referring to FIG. 1 and FIG. 2, the high voltage high current transmission line 10 according to an example embodiment of the present invention generally includes a connector end 20 electrically connected to a load end 60 by an intermediate transmission section 80. In one aspect, the connector end 20 of the present invention is configured to electrically connect to a high voltage high current power source (illustrated in FIG. 9), and the load end 60 is configured to electrically connect the high voltage high current transmission line 10 to an end item (not shown) to which the power is delivered, such as a discharge device.

Figure 3:
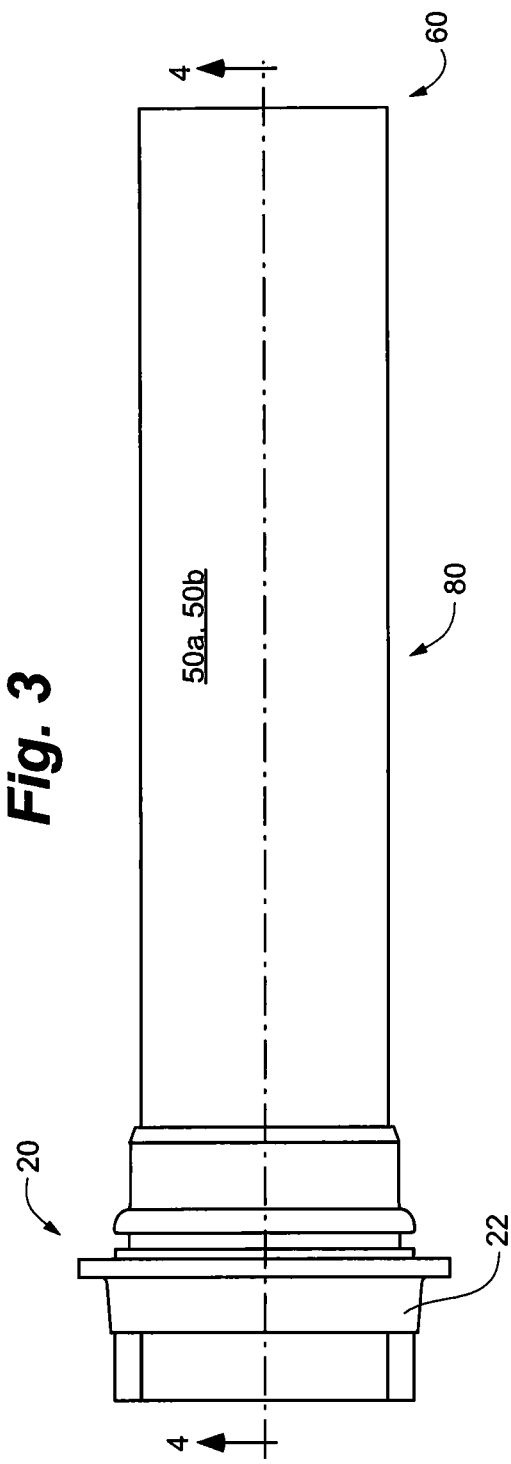
FIG. 3 is a plan view of a high voltage high current transmission line with the dielectric layers and outer sheathing removed to illustrate the two conductive electrode plates and plug assembly according to an embodiment of the present invention.
Figure 4:
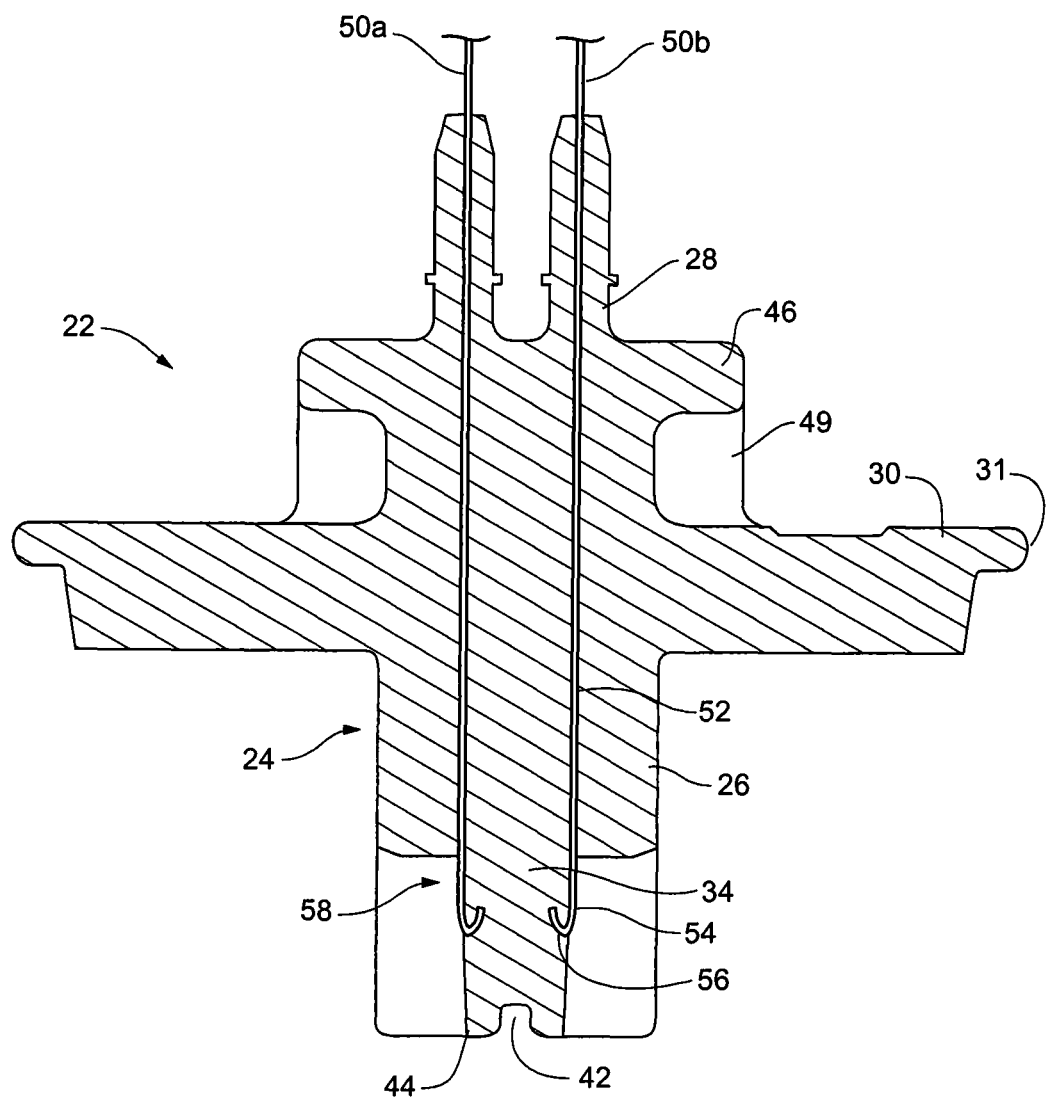
FIG. 4 is a cross sectional view of a plug assembly of the connector end of the high voltage high current transmission line depicted in FIG. 2 along section line A-A with dielectric layers and an outer sheathing layer removed around the two conductive electrode plates.
Figure 5:
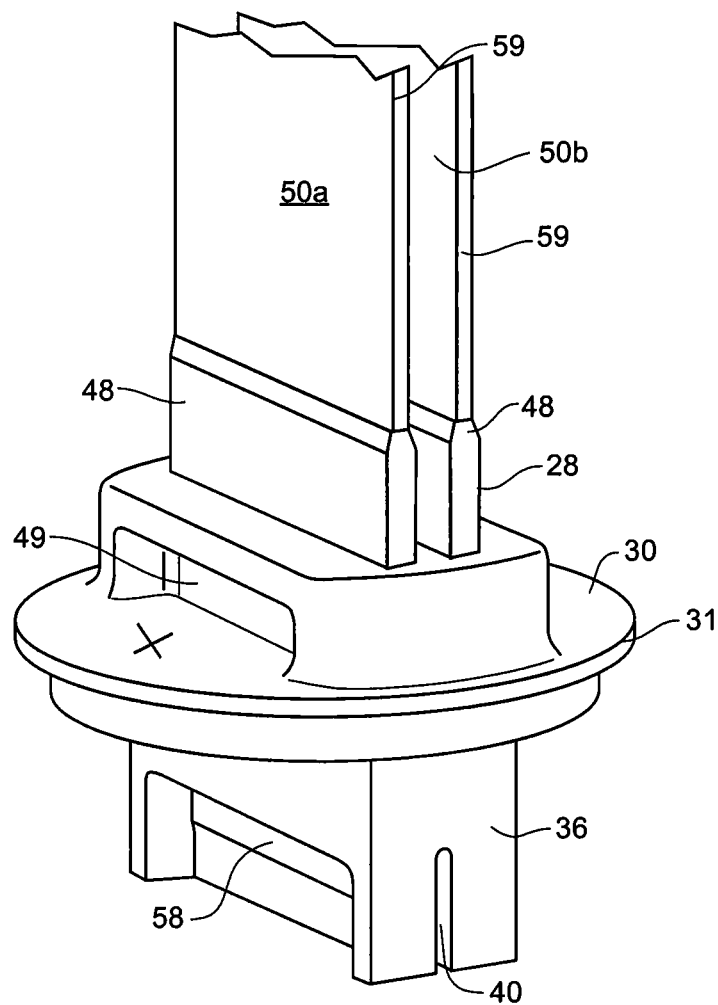
FIG. 5 is a perspective view of the plug assembly as depicted in FIGS. 2 and 3.
Figure 9:
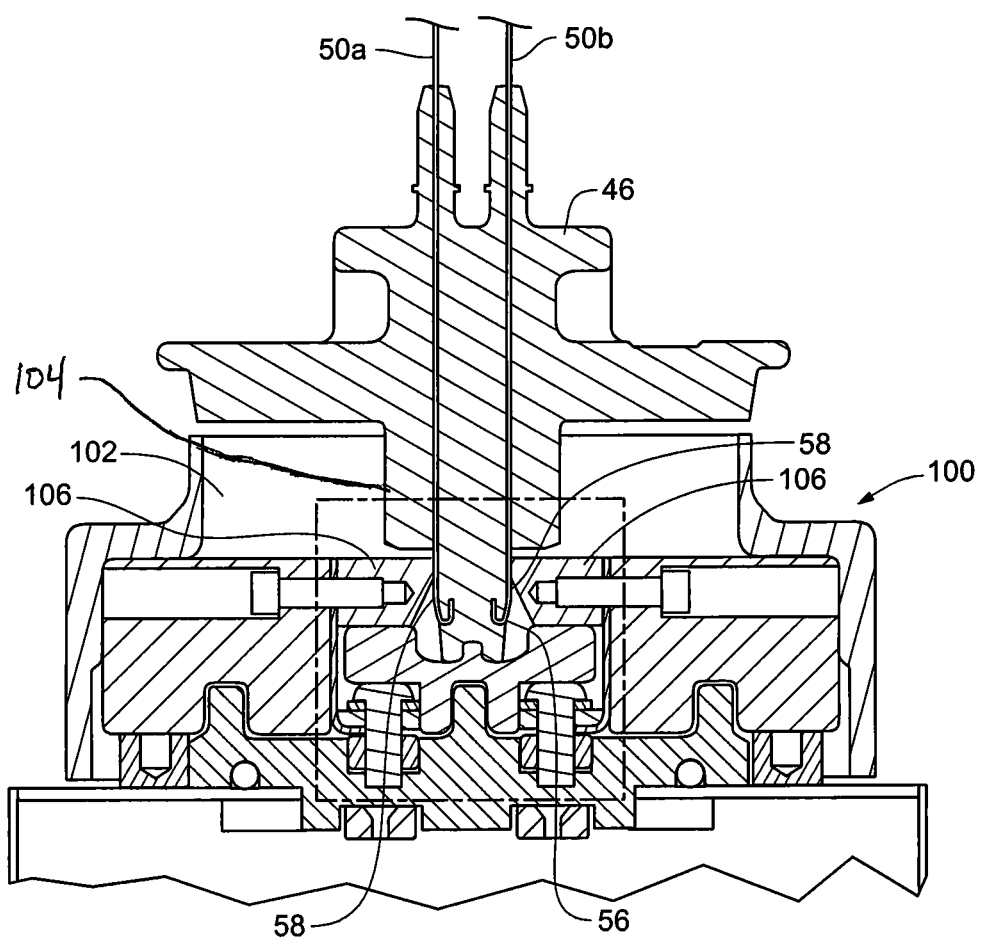
FIG. 9 is a cross sectional view of a plug assembly and a header assembly located on a capacitor according to an example embodiment of the present invention.

In one aspect as shown in FIGS. 1-3, the connector end 20 includes plug assembly 22, which is structured to operably couple with header assembly 100 of a high voltage high current power source, as discussed herein and shown in FIG. 9. Referring to FIGS. 3-5, plug assembly 22 generally includes plug body 24 at least partially surrounding conductive biplates 50a, 50b. In some aspects, plug body 24 at least partially surrounds and supports the two conductive plates 50a, 50b at the connector end 20 of the high voltage high current transmission line 10.

Referring now to FIGS. 4-6, plug body 24 is generally a unitary structure formed of a dielectric material. Plug body 24 may be formed from a polymer and/or elastomeric material. For example, plug body 24 may be formed from a PTFE polymer overmolded with a polyurethane polymer. In some aspects, plug body 24 has a diameter of about 3 to about 6 inches, in some other aspects about 3.5 to about 5 inches, and in some other aspects about 4 inches to about 4.5 inches. Plug body 24 generally includes inner extension 26, outer extension 28 and disk 30. Inner extension 26 generally presents ridge 32, biplate backer 34 and endplates 36. Inner extension 26 also defines biplate passages 34. Inner extension 26 presents asymmetrical polarity slot 40 and rail receiving slot 42. Ridge 32 is generally perpendicular to endplate 36. Endplates 36 generally bound ridge 32 at its peripheral edges. Biplate backer 34 extends generally outwardly away from disk 30 on either side of ridge 32. Biplate passage 38 extends coaxially with surfaces of biplate backer 34 and into inner extension 26, such that the respective conductive plate 50a, 50b is contained within each biplate passage. Asymmetrical polarity slot 40 is presented on one of endplates 36, such that the plug assembly 22 can interface with the respective connection to provide the proper electrical connection (positive-to-positive and negative-to-negative). Rail receiving slot 42 runs along end 44 of ridge 32 generally parallel thereto.

Outer extension 28 generally includes plateau 46 with biplate ridges 48 on top thereof. Plateau 46 also presents finger pulls 49 on sides thereof. Plateau 46 extends outwardly away from disk 30 and biplate ridges 48 extend outwardly away from plateau 46. Finger pulls 49 are indentations into the sides of plateau 46.

Disk 30 is located intermittent between inner extension 26 and outer extension 28 and is generally circular in shape. Disk 30 presents annular ridge 31 on an outer perimeter thereof. Annular ridge 31 may be overmolded with an elastomeric polymer.

Conductive plates 50a, 50b are formed of a highly conductive metallic material such as copper. In one aspect, the conductive plates 50a, 50b are about three inches wide with a thickness of about 0.0625 inches. In another aspect, the conductive plates 50a, 50b are between about 2 inches and about 5 inches wide with a thickness between about 0.02 inches and about 0.125 inches. Other ranges and subranges within these ranges are also contemplated.

With respect to the plug assembly 22, each of the conductive plates 50a, 50b, as best seen in FIGS. 4-6 and 9-10, generally present a straight portion 52, a tapered portion 54, a hook portion 56 and an external portion 58. In one aspect, the external portion 58 includes one or more portions of the straight portion 52, the tapered portion 54, and the hook portion 56. In one aspect, as shown best in FIG. 9, the external portion 58 includes a section of the straight portion 52 and at least a section of the tapered portion 54. In one aspect, the tapered portion 54 is the transition of the conductive plates 50a, 50b between the straight portion 52 and the hook portion 56, such that the width of the conductive plates 50a, 50b remains unchanged. Conductive plates 50a, 50b are positioned abutted to biplate backer 34 on opposite sides thereof. Conductive plates 50a, 50b pass through biplate passages 38 and extend outwardly beyond biplate ridges 48 into the intermediate transmission section 80 that electrically connects the connector end 20 to the load end 60.

Referring now to FIGS. 7 and 8A-8B, the conductive plates 50a, 50b at the intermediate transmission section 80 and the interface between the intermediate transmission section 80 and the connector end 20 are surrounded by a high voltage dielectric 90. The high voltage dielectric 90 includes an edge dielectric 92, a cover dielectric 93, a collar dielectric 94, a first dielectric layer 96, a second dielectric layer 97, and an outer sheathing layer 98.

The edge dielectric 92 is applied to and covers at least a portion of each edge 59 of each conductive plate 50a, 50b. When the edge dielectric 92 is applied to the respective edge 59 of the respective conductive plate 50a, 50b, a gap exists between the two edge dielectrics 92, as shown in FIGS. 7A-7C, such that the entire width of the respective conductive plate 50a, 50b is not covered by the edge dielectrics 92. In one aspect, edge dielectrics 92 are formed from an electrical tape. In one aspect, the edge dielectrics 92 are formed from a high dielectric tape. In one aspect, the high dielectric tape has an electrical strength of at least 3000V under ASTM-D-1000 test method. In one aspect, the edge dielectrics 92 are formed from 3M™ 69 Glass Cloth Electrical Tape, which is a white glass cloth tape with a high-temperature thermosetting silicone adhesive having a thickness of about 7.0 mils (0.177 mm), a tensile strength of about 180 lbs./in (314 N/10 mm), an electrical strength of about 3000V, an insulation resistance of about $4.8 \times 10^4$ megohms under ASTM-D-1000 test method, and is UL recognized for continuous use up to about 200° C.

The cover dielectric 93 is applied to each edge 59 of each conductive plate 50a, 50b and over the edge dielectric 92. As shown in FIGS. 8A-8B, the cover dielectric 93 overlays the entire width of the edge dielectric 92, such that the entire width of the respective conductive plate 50a, 50b is not covered by the cover dielectrics 93. In one aspect, cover dielectrics 93 are formed from an electrical tape. In one aspect, the cover dielectrics 93 are formed from a high dielectric tape. In one aspect, the high dielectric tape has an electrical strength of at least 8000V under ASTM-D-1000 test method. In one aspect, the cover dielectrics 93 are formed from 3M™ Epoxy Film Electrical Tape Super 20, which is about 5 mil (0.127 mm) total thickness, high dielectric flame-retardant tape rated to about 311° C. with an acrylic pressure-sensitive adhesive having a tensile strength of about 45 lbs./in (79 N/10 mm), an electrical strength of about 8000V, and an insulation resistance greater than about $1 \times 10^6$ megohms.

The collar dielectric 94 is located proximate the interface with the plug assembly 22, such that the respective collar dielectric 94 separately encompasses the respective conductive plate 50a, 50b and also at least a portion of the respective outer extension 28 of the plug body 24. The collar dielectrics 94 separately encompass each of the respective conductive plates 50a, 50b and respective outer extensions 28, such that the collar dielectrics 94 are provided in the space between the generally parallel conductive plates 50a, 50b and also the outer extensions 28. In one aspect, the collar dielectrics 94 are applied to the respective conductive plate 50a, 50b and respective outer extension 28 before the respective edge dielectric 92 and/or respective cover dielectric 93. In one aspect, the collar dielectrics 94 are applied to the respective outer extension 28 and respective conductive plate 50a, 50b over the respective edge dielectric 92 and/or respective cover dielectric. In one aspect, the collar dielectrics 94 have a longitudinal length of about 0.25 inches to about 4 inches, in some aspects about 0.5 inches to about 3 inches and in some other aspects about 0.75 inches to about 2 inches, with other subranges within these ranges contemplated. In some aspects, it is contemplated that a separate collar dielectric 94 proximate the interface with the plug assembly 22 is not provided. In one aspect, the collar dielectrics 94 are formed from epoxy film electrical tape as produced by 3M™ or similar product.

The first dielectric layer 96 separately encompasses each of the conductive plates 50a, 50b, the edge dielectrics 92, and cover dielectrics 93, such that first dielectric layer 94 is in contact with at least a portion of cover dielectric 93. As shown in FIGS. 8A-8B, the first dielectric layer 94 separately encompasses each of the respective conductive plates 50a, 50b, such that the first dielectric layers 94 are provided in the space between the generally parallel conductive plates 50a, 50b. At the interface with the plug assembly 22, first dielectric layer 96 also encompasses at least a portion of the collar dielectric 94. In one aspect, the first dielectric layers 94 are in contact with each other in the space between the generally parallel conductive plates 50a, 50b and/or the space between the outer extensions 28. In some alternative aspects, there is a space between at least a portion of the first dielectric layers 96 between the generally parallel conductive plates 50a, 50b and/or the outer extensions 28.

In some alternative aspects when a dielectric collar 94 is not provided at the interface with the plug assembly 22, the first dielectric layer 96 separately encompasses the respective conductive plate 50a, 50b and also at least a portion of the respective outer extension 28 of the plug body 24, such that the first dielectric layers 96 are in direct contact with the outer extension 28 and provided in the space between the generally parallel conductive plates 50a, 50b and also the outer extensions 28. In some aspects, the edge dielectric 92 and/or the cover dielectric 94 may be applied to at least a portion of the outer extension 28 such that the first dielectric layer 96 encompasses such dielectrics at the interface with the plug assembly 22.

In one aspect, the first dielectric layers 96 are formed from a shrink-fit electrical insulation. In one aspect, the first dielectric layers 96 are formed from a shrink-fit electrical insulation having a dielectric strength of at least 900 V/mil. In one aspect, the first dielectric layers 96 are formed from 3M™ Heat Shrink Tubing FP-301 having about a 2:1 shrink ratio, a wall thickness between about 1.14 mm to about 1.40 mm, a tensile strength of about 2400 psi, a dielectric strength of about 900V/mil, a volume resistivity of about $10^{15}$ ohms/cm, and an operating temperature between about −55° C. to about 135° C.

The second dielectric layer 97 encompasses both of the conductive plates 50a, 50b having the first dielectric layers 96, cover dielectrics 93, and edge dielectrics 92. As shown in FIGS. 8A-8B, the second dielectric layer 97 is provided around the first dielectric layers 96, such that the second dielectric layer 97 is not provided in the space between the generally parallel conductive plates 50a, 50b. At the interface with the plug assembly 22, second dielectric layer 97 also encompasses both outer extensions 28 with any other dielectrics applied to the respective outer extensions 28 (i.e. the collar dielectrics 94 and first dielectric layers 96), such that the second dielectric layer 97 is not provided in the space between the outer extensions 28. In one aspect, the second dielectric layer 97 also encompasses at least a portion of plateau 46. In one aspect, the second dielectric layer 97 encompasses plateau 46 such that the second dielectric layer 97 is proximate disk 30. In one aspect, the second dielectric layer 97 encompasses plateau 46 such that the second dielectric layer 97 is in contact with proximate disk 30

In one aspect, the second dielectric layer 97 is formed from a shrink-fit electrical insulation. In one aspect, second dielectric layer 97 is formed from a shrink-fit electrical insulation having a dielectric strength of at least 900 V/mil. In one aspect, the second dielectric layer 97 is formed from 3M™ Heat Shrink Tubing FP-301 with about a 2:1 shrink ratio having a wall thickness between about 1.14 mm to about 1.40 mm, a tensile strength of about 2400 psi, a dielectric strength of about 900V/mil, a volume resistivity of about $10^{15}$ ohms/cm, and an operating temperature between about −55° C. to about 135° C.

The outer sheathing 98 encompasses both of the conductive plates 50a, 50b having the, second dielectric layer 97, first dielectric layers 96, cover dielectrics 93, and edge dielectrics 92. As shown in FIGS. 8A-8B, the outer sheathing 98 is provided around the second dielectric layers 97, such that the outer sheathing 98 is not provided in the space between the generally parallel conductive plates 50a, 50b. At the interface with the plug assembly 22, outer sheathing 98 also encompasses both outer extensions 28 with any other dielectrics applied to the respective outer extensions 28 (i.e., the collar dielectrics 94, the first dielectric layers 96, and the second dielectric layer 97), such that the outer sheathing 98 is not provided in the space between the outer extensions 28. In one aspect, the outer sheathing 98 encompasses at least a portion of plateau 46, and any dielectrics applied thereto (i.e., the second dielectric layer 97). In one aspect, the outer sheathing 98 encompasses plateau 46 such that the outer sheathing 98 is proximate disk 30. In one aspect, the outer sheathing 98 encompasses plateau 46 such that the outer sheathing 98 is in contact with proximate disk 30. In one aspect the outer sheathing 98 has a thickness of about 0.5 mm to about 5 mm thickness, in some aspects about 1 mm to about 4 mm, and in other aspects about 1.5 mm to about 3 mm. The outer sheathing 98 maintains flexibility and provides environmental protection against UV-light, heat, water, and is also a fire preventative.

In one aspect, the outer sheathing 98 is formed from an elastomeric material. In one aspect, the outer sheathing 98 is formed from an elastomeric polyurethane. In one aspect, the outer sheathing 98 is formed from an elastomeric material having a dielectric strength of at least 300 V/mil. In one aspect, the outer sheathing 98 is formed from Rhino Linging® Tuff Stuff™ having a hardness (shore A) of about 85, a tensile strength between about 1700 and about 1900 psi, a dielectric strength of about 300V/mil, a volume resistivity of about $6 \times 10^{12}$ ohms/inch, and a dielectric constant of about 5.4 MgH.

While the foregoing description provided the high voltage dielectric 90 including an edge dielectric 92, a cover dielectric 93, a collar dielectric 94, a first dielectric layer 96, a second dielectric layer 97, and an outer sheathing layer 98, it is contemplated that the high voltage dielectric 90 may contain two or more of any of the foregoing dielectrics. Similarly, it is contemplated that the high voltage dielectric 90 may be provided with one or more of the foregoing dielectrics being absent. For instance, the intermediate transmission section 80 of the present invention may be configured such that the two conductive plates are separately encompassed within at least one dielectric material, and the two conductive plates are both encompassed within two or more layers of outer dielectric layers and an outer sheathing material.

It is also contemplated that the edge dielectrics 92 may be applied to the respective edge 59 of the respective conductive plate 50a, 50b, such that the edge dielectrics 92 on the same respective conductive plate 50a, 50b meet or overlap such that there is no gap between the edge dielectrics 92. It is also contemplated that the cover dielectrics 93 may be applied to the respective edge 59 of the respective conductive plate 50a, 50b having the respective edge dielectric 92, such that the cover dielectrics 93 on the same respective conductive plate 50a, 50b meet or overlap such that there is no gap between the cover dielectrics 93.

Referring now to FIGS. 1 and 9, the load end 60 is configured to electrically connect the high voltage high current transmission line 10 to an end item to which the power is delivered, such as a discharge device.

In one aspect, the load end 60 has a staggered-configuration such that the conductive electrodes 50a, 50b have different longitudinal lengths with the respective high voltage dielectric 90 removed at different areas to provide exposed conductive electrode sections 65a, 65b to allow electric connection to the end device. The exposed conductive electrode sections 65a, 65b may be electrically connected to the end device by fastening means to secure the respective exposed conductive electrode sections 65a, 65b to the end device. For instance, the respective exposed conductive electrode sections 65a, 65b may be riveted to a panel (not shown).

In one aspect, as shown in FIG. 9, the load end 60 contains a plug assembly 22 as previously discussed with respect to the connector end 20.

Figure 10:
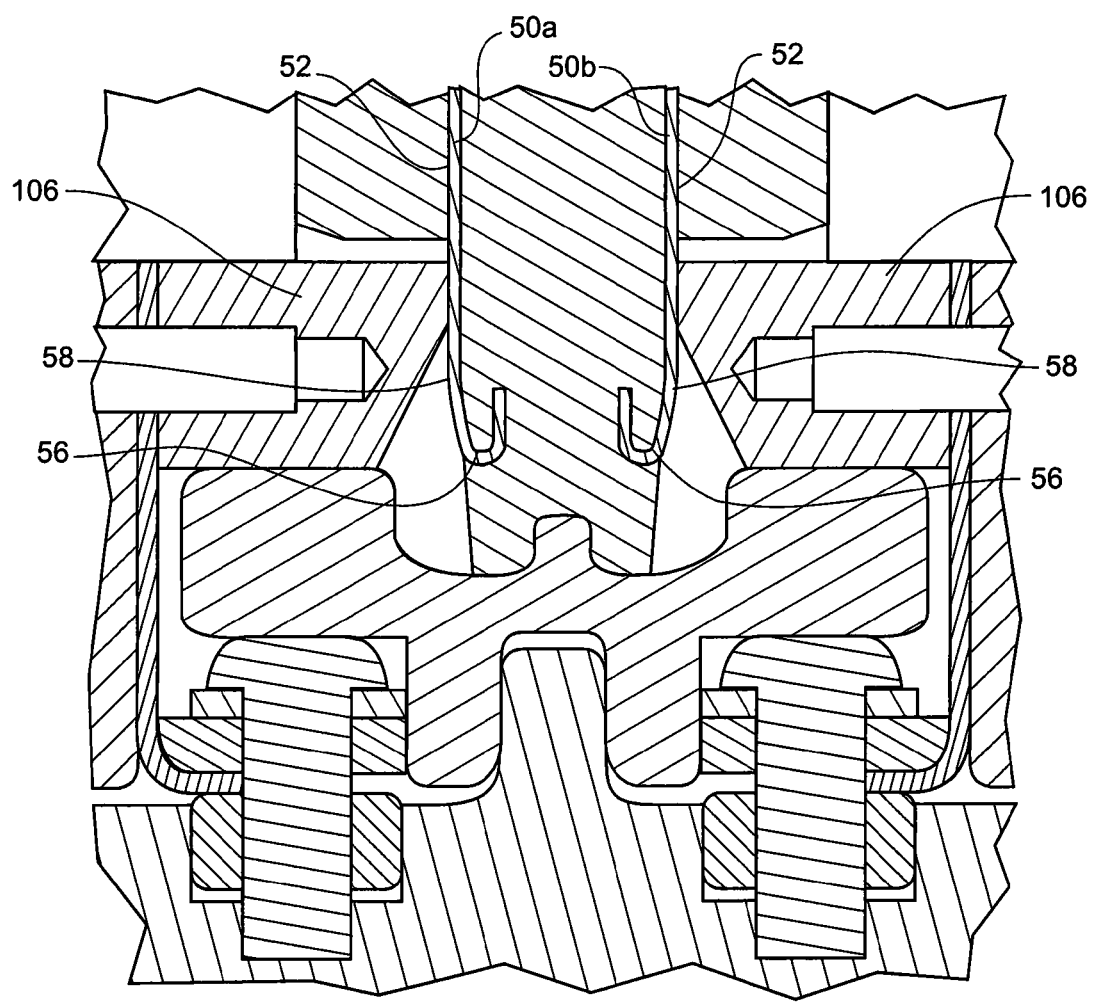
FIG. 10 is a detailed view taken from the dotted box depicted in FIG. 9.

Referring to FIGS. 9-10, the plug assembly 22, whether on the connector end 20 or the load end 60, operably engages a header assembly 100. The connection between plug assembly 22 and header assembly 100, as it relates to the electrical connection with a high voltage high current power source, is described application Ser. No. 13/095,285 and is incorporated by reference in its entirety herein. Header assembly 100 generally includes header body 102 with a receptacle recess 104 into which plug body 24 is operably inserted. Header body 102 is a substantially unitary structure formed of a dielectric material such as PTFE or HDPE. Header body 102 generally has the form of a short circular cylinder, and in the example as shown in FIG. 9, operably receives plug body 24 in the receptacle recess 104 such that external portions 58 of conductive plates 50a, 50b electrically connect with the respective electrical contactors 106. Contactors 106 are a relatively heavy structures made of highly conductive material, such as copper. The distance between the outer surface of the external portions 58 of conductive plates 50a, 50b is greater than the distance between electrical contactors 106.

When it is desirable to electrically couple plug assembly 22 to header assembly 100, plug assembly 22 is inserted into header assembly 100 so that asymmetrical polarity slot 40 is aligned with the corresponding asymmetrical polarity ridge in the header assembly 100. Polarity markings on the plug assembly 22 and header assembly 100 may assist with this alignment. The biplate backer 34 comprised of an elastomeric material provides an outward spring-like force towards each of the external portions 58 of the conductive plates 50a, 50b. Upon insertion of external portions 58 of biplates 50a, 50b into the space between contactors 106, the external portions 58 are forced towards each other and into the biplate backer 34, such that the outward spring-like force provided by the biplate backer 34 provides a sufficiently high contact force between the external portions 58 of the respective conductive plates 50a, 50b and the corresponding contactors 106 of the high voltage high current power source and/or end device to minimize arcing therebetween.

In one aspect, the high voltage high current transmission line 10 of the present invention is manufactured by providing the two conductive plates 50a, 50b, the two conductive plates 50a, 50b having two ends, a proximal end and a distal end. The hook portion 56 on each of the two conductive plates 50a, 50b can already be provided on the proximal end, or the hook portion 56 can be formed bending each of the two conductive plates 50a, 50b at the proximal end to form the respective hook portion 56. The conductive plates 50a, 50b are then arranged in a parallel configuration such that the hook portion 56 on each of the conductive plates 50a, 50b converge towards each other, as illustrated in FIG. 4, with a space provided between the hook portions 56. An elastomeric material is then cast around at least a portion of the proximal end of the conductive plates 50a, 50b proximate the hook portion 56, such that at least a portion of the conductive plates 50a, 50b at the proximal end are encompassed within the elastomeric material, the space between the hook portions 56 at the proximal end is provided with the elastomeric material, an external portion 58 on each of the conductive plates 50a, 50b is provided where the elastomeric material at the proximal end proximate the hook portions 56 is not covered with the elastomeric material, and an interface is provided where the elastomeric material is cast around the two conductive plates and where the elastomeric material is not cast around the two conductive plates. After the elastomeric material is cast, at least one dielectric material is applied to at least one of the two conductive plates proximate the interface.

In one aspect, a first dielectric layer is applied around at least a portion of each of the two conductive layers, and a second dielectric layer is applied around at least a portion of both of the two conductive layers proximate the first dielectric layer.

In one aspect, at least one dielectric material is applied over the edge of at least a portion of each of the two conductive layers, a first dielectric layer is applied around at least a portion of each of the two conductive layers proximate the one or more dielectric materials over the edges, and a second dielectric layer is applied around at least a portion of both of the two conductive layers proximate the first dielectric layer.

In one aspect, a dielectric material is applied at the interface on the proximal end such that the dielectric material is applied around at least a portion of the cast elastomeric material and at least a portion of at least one of the conductive plates 50a, 50b. In one aspect, a first and second dielectric material is applied at the interface on the proximal end such that the first dielectric material is applied around at least a first portion of the cast elastomeric material and at least a portion of conductive plate 50a, and the second dielectric material is applied around at least a second portion of the cast elastomeric material and at least a portion of conductive plate 50b, such that the first and second dielectric material are provided in the space between the two generally parallel conductive plates 50a, 50b and/or the first and second portions of the cast elastomeric material.

In one aspect, an outer sheathing 98 is applied to encompass the conductive plates 50a, 50b with the one or more dielectric layers. In one aspect, the outer sheathing 98 is applied to also encompass at least a portion of the cast elastomeric material.

In one aspect, the distal end has the same configuration as the proximal end with hook portions 56 on the two conductive plates 50a, 50b, and an elastomeric material is cast at the distal end in the same way as described with respect to the proximal end. After the elastomeric material is cast proximate the distal end, at least one dielectric material is applied to at least one of the two conductive plates proximate the interface. An outer sheathing 98 may also be applied to encompass at least a portion of the cast elastomeric material on the distal end, as shown in FIG. 7.

The above disclosure is intended to be illustrative and not exhaustive. This description will suggest many variations and alternatives to one of ordinary skill in the art without departing from the scope of the present invention. Since the present invention may be embodied in other specific forms without departing from the spirit of the essential attributes thereof, the illustrated embodiments should be considered in all respects as illustrative and not restrictive, reference being made to the appended claims rather than to the foregoing description to indicate the scope of the invention.

The invention claimed is:

1. A high voltage high current transmission line, comprising:
    two conductive plates each having a proximal end and a distal end, at least a portion of the two conductive plates spaced apart a distance in a generally parallel configuration, and each of the two conductive plates having a hook portion proximate the proximal end;
    a first dielectric material encompassing at least a portion of at least one of the two conductive plates such that the first dielectric material is provided between the two conductive plates; and
    a second dielectric material encompassing at least a portion of both conductive plates proximate the first dielectric material such that the second dielectric material is not provided between the two conductive plates.

2. The high voltage high current transmission line of claim 1, further comprising a third dielectric material provided on at least one edge portion of at least one of the two conductive plates.

3. The high voltage high current transmission line of claim 1, wherein at least a portion of both conductive plates are encompassed by the first dielectric material.

4. The high voltage high current transmission line of claim 1, further comprising a third dielectric material provided on at least one edge portion on each of the two conductive plates.

5. The high voltage high current transmission line of claim 4, wherein the third dielectric material is provided between the respective conductive plates and the first dielectric material.

6. The high voltage high current transmission line of claim 5, further comprising an outer dielectric sheathing encompassing at least a portion of both conductive plates proximate the first and second dielectric materials such that the outer dielectric sheathing is not provided between the two conductive plates.

7. The high voltage high current transmission line of claim 1, further comprising a plug assembly proximate the proximal end having a dielectric biplate backer abutting each of the two conductive plates at least between the hook portions.

8. The high voltage high current transmission line of claim 7, further comprising an exposed surface on each of the conductive plates proximate the distal end.

9. The high voltage high current transmission line of claim 8, further comprising a second plug assembly proximate the distal end having a second dielectric biplate backer abutting each of the two conductive plates, the exposed surface on each of the conductive plates on opposed sides of the second dielectric biplate backer.

10. The high voltage high current transmission line of claim 8, wherein the exposed surface on each of the conductive plates are in a staggered configuration such that there is no overlap.

11. The high voltage high current transmission line of claim 7, the plug assembly comprising a dielectric plug body encompassing at least a portion of the two conductive plates.

12. The high voltage high current transmission line of claim 11, wherein the dielectric plug body further comprises an inner extension portion, an outer extension portion and a centrally located disk portion between the inner extension portion and the outer extension portion.

13. The high voltage high current transmission line of claim 11, the plug assembly having an exposed surface on each of the conductive plates proximate on opposed sides of the dielectric biplate backer.

14. The high voltage high current transmission line of claim 11, further comprising an outer dielectric sheathing encompassing at least a portion of both conductive plates proximate the first and second dielectric materials such that the outer dielectric sheathing is not provided between the two conductive plates.

15. The high voltage high current transmission line of claim 14, wherein the outer dielectric sheathing encompasses at least a portion of the plug body.

16. A high voltage high current transmission line, comprising:
    a first conductive plate and a second conductive plate spaced apart a distance in a generally parallel configuration, the first and second conductive plates each having a proximal end and a distal end;
    a first dielectric material encompassing at least a portion of the first conductive plate and a second dielectric material encompassing at least a portion of the second conductive plate, such that the first and second dielectric materials are provided between the first and second conductive plates;
    a third dielectric material encompassing at least a portion of both the first and second conductive plates proximate the first and second dielectric materials, such that the third dielectric material is not provided between the first and second conductive plates; and
    an outer dielectric sheathing encompassing at least a portion of both the first and second conductive plates proximate the third dielectric material, such that the first, second and third dielectric materials are provided between the outer dielectric sheathing and the first and second conductive plates.

17. A method of making a high voltage high current transmission line, the method comprising:
    providing a first conductive plate and a second conductive plate, the first and second conductive plates each having a proximal end and a distal end connected by an intermediate section, and the first and second conductive plates having a hook portion proximate the proximal end;

arranging the first and the second conductive plates in a generally parallel configuration;

casting an elastomeric material around at least a portion of the proximal end, such that the elastomeric material encompasses at least a section of the hook portions, an exposed surface is provided on each the first and second conductive plates proximate the hook portions, and an interface is provided between the elastomeric material and the intermediate section of the first and second conductive plates;

applying a first dielectric material around at least a portion of the first conductive plate at the intermediate section such that the first dielectric material is provided between the first and second conductive plates;

applying a second dielectric material around at least a portion of both the first and second conductive plates proximate the first dielectric material such that the second dielectric material is not provided between the first and second conductive plates; and applying an outer sheathing material around at least a portion of the elastomeric material and at least a portion of both the first and second conductive plates proximate the first and second dielectric materials such that the first and second dielectric materials are provided between the outer sheathing and at least a portion of the first and second conductive plates.

18. The method of making a high voltage high current transmission line of claim 17, the method further comprising applying a third dielectric material over at least a portion of an edge of the first and second conductive plates.

* * * * *